Patented Aug. 31, 1943

2,328,490

UNITED STATES PATENT OFFICE 2,328,490

DIPHENYLSULPHONE DERIVATIVE

Paul Pöhls, Wuppertal-Elberfeld, Germany, assignor to Winthrop Chemical Company, Inc., New York, N. Y., a corporation of New York No Drawing. Application September 13, 1940, Serial No. 356,654. In Germany September 4, 1939

6 Claims. (Cl. 260—397.6)

This invention relates to diphenylsulphone derivatives.

4,4'-diamino-diphenylsulphone and certain derivatives thereof have a favorable influence on the streptococci infections of the warm-blooded individuals. These compounds are, however, not suitable for injection purposes since they themselves are practically insoluble in water and since their mineral acid salts because of a low basicity of the base react acid to congo and, therefore, cause necrosis upon subcutaneous injection.

In the copending application Ser. No. 274,228, filed May 17, 1939, now U. S. Patent 2,297,024 diphenylsulphone derivatives which are readily soluble in water with neutral reaction and, therefore, are suitable for injection purposes and which still have a high activity on the streptococci infections have been described; said diphenylsulphone derivatives contain in the 4- and 4'-positions bound, for instance, by carbamide groups, organic radicals bearing on their part, if desired in the form of their salts with bases, groups rendering the products soluble in water with neutral reaction.

In accordance with the present invention, diphenylsulphone derivatives which likewise are soluble in water with neutral reaction and still have an improved activity, are obtainable by the manufacture of diphenylsulphone derivatives which contain in the 4-position a nitro-, amino- or acylamino-group and in the 4'-position a urea-group, a nitrogen atom of which is connected with an organic radical rendering the diphenylsulphone compound soluble in water by the presence of at least one water-solubilizing group. The said organic radical may be an aliphatic, aromatic and/or heterocyclic radical. The water-solubilizing group contained in this radical may be a carboxylic-, sulphonic- or sulphinic acid group or may be represented by a number of aliphatically bound hydroxyl groups as are present, for instance, in the poly-hydroxyl compounds derived from sugars. The acyl group of the acylamino group which may stand in the 4-position of the diphenylsulphone compound may be a radical of an aliphatic or aromatic acid, such as the carbonic ester or the carbamic acid radical, the radicals of acetic, propionic, lactic, butyric, isobutyric, valeric, isohexylic, benzoic acid and other such usual acid radicals. The afore-mentioned compounds containing an acid group are preferably used in the form of their salts with inorganic or organic bases for injection purposes. Suitable salts are, for instance, the sodium-, ammonium-, calcium-, diethylamine-, ethanolamine-, diethanolamine-, piperidine-, ethylenediamine-, piperazine and similar salts. The new compounds are distinguished by a good stability. They have the general formula

wherein X stands for a nitrogenous group such as the nitro, amino and acylamino groups, and R stands for the organic radical rendering the products soluble in water such as the radicals of aliphatic polyhydroxy compounds derived from sugars and of alkyl carboxylic, sulphonic and sulphinic acids and aromatic and heterocyclic carboxylic, sulphonic and sulphinic acids including the benzoylamino-substituted aromatic and heterocyclic carboxylic, sulphonic and sulphinic acids, a ring carbon atom of the benzoyl radical of which is attached to the carbamide nitrogen.

In accordance with the present invention, the said new compounds are obtained by reacting an isocyanate or an urethane of a 4-nitro-4'-aminodiphenylsulphone or of a 4-acylamino-4'-aminodiphenylsulphone with an organic compound containing apart from an amino group at least one water-solubilizing group; or vice-versa an isocyanate or a urethane of an organic compound containing the water-solubilizing group, if desired in the form of an ester derivative, may be reacted with a 4-nitro-4'-amino-diphenylsulphone or with a 4-acylamino-4'-amino-diphenylsulphone. The urethane aryl esters, i. e. carbamic acid aryl esters, are preferably used as the urethane compounds referred to above.

The new compounds are also obtainable by oxidizing diphenylsulphides or diphenylsulphoxides which are substituted in the 4-position by a nitro-, amino- or acylamino group and in the 4'-position by a urea group, the one nitrogen atom of which is connected with the above specified organic radical having a water-solubilizing group, to the above characterized diphenylsulphone derivatives by the action of an oxidizing agent such as hydrogen peroxide or permanganate.

The said new products furthermore have been obtained by introducing a water-solubilizing group according to the methods usual for this purpose into an organic radical which is connected by means of the urea group with the 4'-position of a 4-nitro-, 4-amino- or 4-acylamino-diphenylsulphone. The said groups may be introduced directly or by converting groups which are present in the said organic radical and which can be converted into carboxylic-, sulphonic-, sulphinic- or hydroxyl groups according to the methods known per se. Thus, for instance, carboxylic ester, -amide or -nitrile groups or sulphonic acid ester groups or acyloxy groups may be saponified or methyl, aldehyde or mercapto groups may be oxidized to the carboxylic or sulphonic acid group.

The 4-amino-diphenylsulphone compounds of the kind above specified may be further obtained by reducing a nitro- or azo group standing in the 4-position of the diphenylsulphone, the 4'-position of which is connected by means of the urea group with the said water-solubilizing organic radical, or azomethine or acylamino groups standing in the 4-position of diphenylsulphone compounds as mentioned before may be converted into the corresponding 4-amino compounds by saponification.

The invention is furthermore illustrated by the following examples, without being restricted thereto:

*Example 1*

36 grams of 4-nitro-4'-[N'-(3'',5''-dicarbomethoxy-phenyl)-carbamido]-diphenylsulphone are saponified with alcoholic sodium hydroxide solution (10%). The dicarboxylic acid (22.5 grams), obtained after acidifying, decomposes at 225–226° C. It has the following formula:

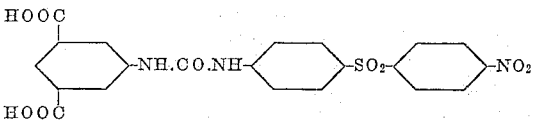

The starting material is obtained as follows: 27.8 grams of 4-nitro-4'-aminodiphenylsulphone are boiled for 5 hours with 23.5 grams of 1-isocyanatebenzene-3,5-dicarboxylic acid methylester in 300 ccms. of acetone. The condensation product which has separated is sucked off, washed with ether and dried at 100° C. 36 grams melting at 245° C. are obtained.

*Example 2*

40 grams of 4-acetylamino-4'-[N'-(3'',5''-dicarbomethoxy-phenyl)-carbamido]-diphenylsulphone are boiled with alcoholic sodium hydroxide solution (10%) for 1 minute under reflux. After acidifying 32.5 grams of the dicarboxylic acid, decomposing at 231–233° C., are obtained. The product has the following formula:

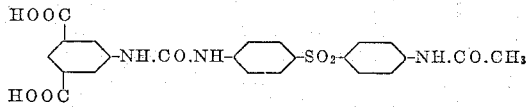

The starting material is obtained as follows: 29 grams of 4-acetylamino-4'-amino-diphenylsulphone are boiled under reflux for 3 hours with 23.5 grams of 1-isocyanatebenzene-3,5-dicarboxylic acid methylester in 300 ccms. of acetone. The condensation product is sucked off in the cold, washed with ether and dried at 100° C. 40 grams melting at 240° C. are obtained.

*Example 3*

27.8 grams of 4-nitro-4'-amino-diphenylsulphone are dissolved in 100 ccms. of dioxane, 12.5 grams of dimethylaniline are added and 16 grams of chloroformic acid phenylester are slowly dropped while stirring. After heating for half an hour on the waterbath, 26.3 grams of 2-naphthylamine-6-sulphonic acid, dissolved in 400 ccms. of 1% sodium hydroxide solution, are added thereto. The solution is standardized to a pH of 7.5 by the addition of primary sodium phosphate and boiled for 4 hours under reflux while stirring. The 4-nitro-diphenylsulphone-carbamic acid phenylester dissolves thereupon. The reaction solution is made slightly alkaline and the dimethylaniline is blown off with steam.

After acidifying with glacial acetic acid the phenol is removed with steam and the clear red solution is cooled with ice. The condensation product precipitates as a yellow, crystalline precipitate. It is sucked off and dried in the air. The product has the following formula:

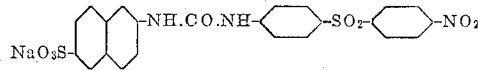

*Example 4*

80 grams of iron, 10 ccms. of glacial acetic acid and 200 ccms. of water are boiled under reflux while stirring and an aqueous solution, as remains in Example 3 after removing the dimethylaniline and the phenol, is dropped thereto. After 4 hours' boiling, it is sucked off while hot and the filtrate is acidified with hydrochloric acid after cooling. The 4-amino-4'-[N'-6''-sulphonic acid-naphthyl-(2'')-carbamido]-diphenylsulphone which has precipitated is sucked off, washed with water and dried in the air. The product has the following formula:

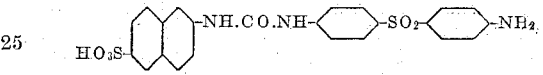

*Example 5*

29 grams of 4-amino-4'-acetylamino-diphenylsulphone are suspended in 150 ccms. of dioxane. 12.5 grams of dimethylaniline are added and 16 grams of chloroformic acid phenylester are dropped thereto while stirring. The temperature rises to almost 70° and the 4-amino-4'-acetylamino-diphenylsulphone is dissolved. After further heating for half an hour on the waterbath, 26.3 grams of 2-naphthylamine-6-sulphonic acid, dissolved in 400 ccms. of a 1% sodium hydroxide solution, are added thereto and the solution is standardized to a pH of 7.5. After 5 hours' boiling and stirring the precipitated 4'-acetylamino-diphenylsulphone-(4)-carbamic acid phenylester has dissolved. The clear solution is freed from dimethylaniline and phenol as described in Example 3 and poured into 1000 ccms. of 35% sodium chloride solution while stirring. The condensation product precipitated thereupon is sucked off and dried in the air. The product has the following formula:

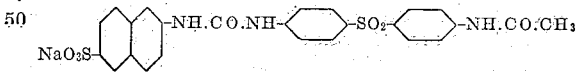

In the same manner, 2-naphthylamine-3,6-disulphonic acid, 6-aminoquinoline-(4)-sulphonic acid and 6-aminobenzthiazole-(2)-sulphonic acid are reacted with the 4-acetylamino-diphenylsulphone-4'-carbamic acid phenylester to the corresponding sulphone compounds.

Likewise, the 4-amino-4'-benzoylaminodiphenylsulphone melting at 250° C. as well as the 4-amino-4'-isohexoylamino-diphenylsulphone melting at 112° C. are reacted by way of their 4-carbamic acid phenylesters with 2-naphthylamine-6-sulphonic acid and the corresponding sulphone compounds thus obtained.

The 4-amino-4'-benzoylamino-diphenylsulphone employed as starting material, melting at 250° C., is obtained from 4-nitro-4'-amino-diphenylsulphone and benzoylchloride in acetone-pyridine and reduction of the 4-nitro-4'-benzoylamino-diphenylsulphone formed melting at 226° C.

In the same manner the 4-amino-4'-isohexoylamino-diphenylsulphone is obtained by heating isohexylic acid chloride with 4-amino-4'-nitrodiphenylsulphone in the presence of pyridine and by reduction of the nitro compound formed.

Instead of the chloroformic acid phenylester, the chloroformic acid-β-naphthylester (boiling at 158° C. under 15 mms. pressure), for instance, may be used for producing the carbamic acid arylester compounds. The carbamic acid β-naphthylesters thus formed react slowly with the aminocompounds, while splitting off β-naphthol and forming the urea derivatives of the sulphone compounds.

Example 6

24.5 grams of 4-acetylamino-4'-[N'-(6''-carbomethoxynaphthyl-2'')-carbamido]-diphenylsulphone are boiled with 200 ccms. of alcohol, 20 ccms. of 28% sodium hydroxide solution and 20 ccms. of water for 1 minute. By acidifying with hydrochloric acid the carboxylic acid formed precipitates as a white precipitate which is sucked off, washed with water and dried at 100° C. It melts at 280-281° C. with decomposition. The product has the following formula:

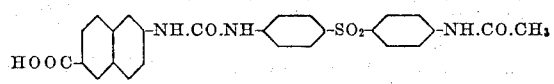

The starting product is obtained as follows:

18 grams of naphthyl-2-isocyanate-6-carboxylic acid methylester are boiled with 23 grams of 4-acetylamino-4'-amino-diphenylsulphone in 250 ccms. of acetone for 10 hours under reflux. The condensation product is sucked off in the cold, washed with ether and dried at 100° C. It melts at 230° C. with decomposition.

Example 7

20 grams of 4-nitro-4'-[N'-carboethoxymethyl-carbamido]-diphenylsulphone are subjected to saponification with a 10% alcoholic sodium hydroxide solution for a short time. The carboxylic acid formed is precipitated with dilute hydrochloric acid, sucked off, washed with water and dried at 100° C. It has the following formula:

The starting material is obtained as follows:

27.8 grams of 4-nitro-4'-amino-diphenylsulphone are boiled under reflux for 8 hours with 13 grams of isocyanateacetic acid ethylester in 200 ccms. of acetone. The clear solution is filtered from some impurities and concentrated. Upon cooling the condensation product crystallizes in yellow crystals. It is sucked off, washed with ether and dried at 100° C. It melts at 212-213° C.

Example 8

20 grams of 4-nitro-4'-[N'-(4''-sulphofluoride-phenyl)-carbamido]-diphenylsulphone are saponified with alcoholic sodium hydroxide solution (10%). The clear solution is added to a 35% sodium chloride solution while stirring whereupon the sodium salt of the corresponding sulphonic acid precipitates. It has the following formula:

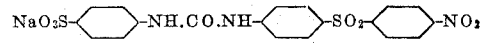

The starting product is obtained as follows:
27.8 grams of 4-amino-4'-nitro-diphenylsulphone are boiled for one hour with 20.1 grams of phenylisocyanate-4'-sulphofluoride in 300 ccms. of acetone. The condensation product is sucked off in the cold, washed with ether and dried at 100° C. The phenylisocyanate-4'-sulphofluoride has been prepared as follows:

117 grams of p-acetylamino-benzenesulphochloride are treated with 1000 ccms. of water and 35 grams of sodiumfluoride for 3 hours at 40-45° C. while stirring. The p-acetylaminobenzenesulphofluoride thus obtained is sucked off and washed with water. Then it is dissolved in acetone and the solution is dried with potassium carbonate. After evaporation of the acetone, 53 grams of p-acetylamino-benzenesulphofluoride melting at 156-157° C. are obtained. 53 grams of this product are boiled with 200 ccms. of dilute hydrochloric acid under reflux. The solution is filtered while hot and the 4-aminobenzenesulphofluoride is precipitated with sodium acetate. The base is dissolved in ether and the solution is dried with potassium carbonate. After evaporation of the ether the 4-aminobenzenesulphofluoride melting at 72-73° C. is obtained. 60 grams of this product are dissolved in 500 ccms. of benzene. Phosgene is introduced into this solution at usual temperature while stirring. Thereupon the hydrochloric acid salt of the p-aminobenzene-sulphofluoride precipitates. Phosgene is still introduced under reflux while stirring until the hydrochloric acid salt has disappeared and an almost clear solution has been formed. The excess phosgene is removed by introducing air. The benzene solution is filtered and concentrated under reduced pressure. The residue, the phenylisocyanate-4-sulphofluoride, distils at 132° C. under 11 mms. pressure.

Example 9

10 grams of 4-nitro-4'-[N'-carboxymethyl-carbamido]-diphenylsulphide are treated with 150 ccms. of glacial acetic acid and 50 ccms. of a 25% aqueous hydrogen peroxide solution for 15 hours at normal temperature while stirring. The 4-nitro-4'-[N'-carboxy-methyl-carbamido]-diphenylsulphone formed is sucked off, washed with water and dried at 100° C. It melts at 205-208° C. with decomposition. The product has the following formula:

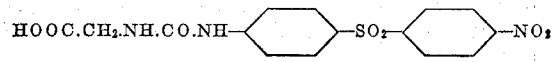

The starting material is obtained as follows:
49.2 grams of 4-nitro-4'-aminodiphenylsulphide are boiled under reflux in 400 ccms. of acetone with 26 grams of isocyanate-acetic ester for 2 hours. After cooling the crystallized 4-nitro-4'-[N'-carbethoxymethyl-carbamido]-diphenylsulphide is sucked off, washed with ether and dried at 100° C. It melts at 201-202° C. 58.5 grams of this ester are boiled under reflux with 150 ccms. of 10% alcoholic sodium hydroxide solution, 150 ccms. of alcohol and 50 ccms. of water for 1 minute. The undissolved particles are filtered off from the red solution and the filtrate is acidified with dilute hydrochloric acid. The separated yellow acid, the 4-nitro-4'-[N'-carboxymethyl-carbamido]-diphenylsulphide, is sucked off, washed with water and dried at 100° C. It melts at 171° C. with decomposition.

Example 10

25 grams of 4-carbamido-4'-[N'-carboxymethyl-carbamido]-diphenylsulphide are treated with 200 ccms. of glacial acetic acid and 100 ccms. of 25% aqueous hydrogenperoxide solution for 15 hours at usual temperature while stirring. The 4-carbamido-4'-[N'-carboxy-methyl-carbamido]-diphenylsulphone formed is sucked off, washed with water and dried at 100° C. It melts above 260° C.; from 250° C. a gradual dark-coloring of the compound begins. The product has the following formula:

The starting material is obtained as follows:

51.8 grams of 4-carbamido-4'-amino-diphenylsulphide are boiled under reflux for 2 hours with 26 grams of isocyanateacetic ester in 200 ccms. of acetone. The 4-carbamido-4'-[N'-(carbethoxy-methyl)-carbamido]-diphenylsulphide crystallizes already while still warm. It is sucked off after cooling, washed with ether and dried at 100° C. It melts above 260° C.; from 250° C. a gradual dark-coloring begins.

62.5 grams of this ester are boiled with 150 ccms. of 10% alcoholic sodium hydroxide solution, 150 ccms. of alcohol and 50 ccms. of water for 2 minutes under reflux. The difficultly soluble sodium salt of the 4-carbamido-4'-[N'-carboxymethyl-carbamido]-diphenylsulphide is sucked off, washed with alcohol and dried at 100° C. It is soluble in hot water.

The 4-carbamido-4'-[N'-carboxymethyl-carbamido]-diphenylsulphide is obtained from the sodium salt by the action of hydrochloric acid. The melting point is not characteristic same as in the case of the ester.

*Example 11*

15.2 grams of methylglucamine are dissolved in 200 ccms. of water. 32 grams of 4-acetylamino-diphenylsulphone-4'-carbamic acid phenylester and 150 ccms. of dioxane are added thereto. The mixture is boiled while stirring and under reflux. After 1 hour's boiling the carbamic acid phenylester has dissolved. The clear solution is filtered with animal charcoal while hot and the filtrate is evaporated under reduced pressure. The glass-like solidifying residue is dissolved in methanol, the solution is filtered while hot with animal charcoal and the methylalcohol is evaporated under reduced pressure. The residue of the 4-acetylamino-4'-[N'-(1'',2'',3'',4'',5''-pentahydroxy-hexyl)-N'-methylcarbamido]-diphenylsulphone dissolves readily in water. The product has the following formula:

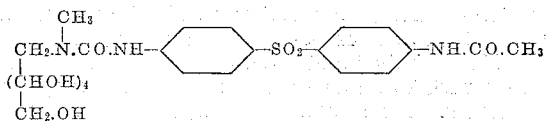

In the same manner, the 4-propionylamino-diphenylsulphone-4'-carbamic acid phenylester, the 4-methoxy-acetylamino-diphenylsulphone-4'-carbamic acid phenylester and the 4-carbamido-diphenylsulphone-4'-carbamic acid phenylester are reacted with methylglucamine to the corresponding urea compounds.

*Example 12*

29.1 grams of 4-carbamido-4'-aminodiphenylsulphone are suspended in 100 ccms. of dioxane. 12.5 grams of dimethylaniline are added and 16 grams of chloroformic acid phenylester, diluted with acetone, are dropped thereto while stirring. The 4-carbamido-4'-aminodiphenylsulphone gradually dissolves. After 1 hour's heating to 80° C. a hot solution of 2-naphthylamine-6-sulphonic acid in 300 ccms. of water and 4 grams of sodium hydroxide are added. The mixture is standardized to a pH of 7.5 by adding primary sodium phosphate and boiled for 4 hours while stirring and under reflux. The 4-carbamido-di-phenylsulphone-4'-carbamic acid phenylester is dissolved thereupon. The solution is rendered weakly alkaline and the dimethyl-aniline is blown off with steam. The clear solution is strongly concentrated under reduced pressure. After cooling the precipitated 4-carbamido-4'-[N'-(2''-sodium-naphthalene-6''-sulphonate) carbamido]-diphenylsulphone is sucked off and dissolved in methanol. The methylalcoholic solution is evaporated under reduced pressure. The remaining urea compound dissolves readily in cold water. It has the following formula:

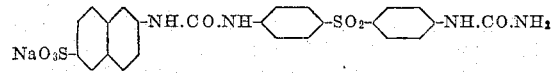

The 4-carbamido-4'-amino-diphenylsulphone employed as starting material is obtained by reacting potassium cyanate upon 4-amino-4'-nitrodiphenylsulphide in glacial acetic acid in the presence of concentrated hydrochloric acid, oxidation of the 4-carbamido-4'-nitrodiphenylsulphide formed melting at 205° C. in glacial acetic acid with hydrogenperoxide and reduction of the 4-carbamido-4'-nitrodiphenylsulphone melting at 225° C.

In the same manner, the 4-carbomethoxy-amino-4'-aminodiphenylsulphone is transformed over the 4'-carbamic acid phenylester with 2-naphthylamine-6-sulphonic acid into the corresponding urea compound. The 4-carbomethoxy-amino-4'-aminodiphenylsulphone employed as starting material and melting at 235° C. is obtained as follows:

4-amino-4'-nitrodiphenylsulphide is converted in acetone solution in the presence of pyridine by means of chloroformic acid methylester into the 4-carbomethoxyamino-4'-nitrodiphenylsulphide melting at 157° C., the latter oxidized in glacial acetic acid with hydrogenperoxide to the 4-carbomethoxyamino-4'-nitrodiphenylsulphone, melting at 226° C., and the nitro-group of this compound reduced to the amino group.

*Example 13*

44.4 grams of mono-sodium salt of the 2-(3'-aminobenzoyl-amino)-naphthalene-3,6-disulphonic acid are dissolved in 300 ccms. of water while adding 4 grams of sodium hydroxide. 41 grams of 4-acetylamino-diphenylsulphone-4'-carbamic acid phenylester and 200 ccms. of dioxane are added thereto. The mixture is standardized to a pH of 7.5 and boiled under reflux while stirring. After 6 hours' boiling a small test portion of this mixture gives no longer a precipitate when diluted with water. The clear solution is filtered while hot with animal charcoal and the filtrate is added after cooling to a 35% sodium chloride solution while stirring. Thereupon, the di-sodium salt of the sulphone-({N-phenyl-4-acetamide}:{2-[3'-(4''-phenylcarbamido)-benzamido]-naphthalene-disulphonic acid-(3,6)}) precipitates. It is dissolved in methanol. The methylalcoholic solution is filtered from undissolved sodium chloride and evaporated to dryness. It has the following formula:

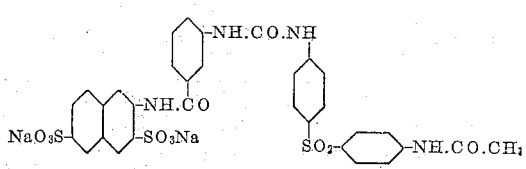

The 2-(3'-aminobenzoyl)-aminonaphthalene- 3,6-disulphonic acid employed as starting material is obtained as follows:

36.5 grams of the mono-sodium salt of the 2-naphthylamine-3,6-disulphonic acid are dissolved in 250 ccms. of water containing 4 grams of sodium hydroxide. 30 grams of sodiumacetate are added thereto and, at a temperature of 30–35° C., 36.5 grams of m-nitro-benzoylchloride are introduced while stirring. After a short time, the sodium salt of the 2-(3'-nitrobenzoylamino)-naphthalene-3,6-disulphonic acid crystallizes. It is sucked off, dissolved in hot water and this solution is dropped into a boiling mixture of 500 grams of iron, 1000 ccms. of water and 10 ccms. of glacial acetic acid while stirring. After 5 hours' boiling, the reaction mixture is made alkaline with sodium carbonate, filtered with animal charcoal while hot and the filtrate is mixed with a large quantity of hydrochloric acid after cooling. Thereupon, the 2-(3'-aminobenzoylamino)-naphthalene-3,6-sulphonic acid precipitates in crystals. It is sucked off and dried at 100° C.

In the same manner, the 2-(4'-aminobenzoylamino)-naphthalene-3,6-disulphonic acid, the 2-(4'-aminobenzoylamino)-naphthalene-6,8-disulphonic acid, the 1-(4'-aminobenzoylamino)-naphthalene-3,8-disulphonic acid and the 2-(4'-aminobenzoylamine)-6-sulphonic acid are produced and reacted with 4-acetylamino-diphenylsulphone-4'-carbamic acid phenylester to the corresponding sulphone compounds.

I claim:

1. A diphenylsulphone compound of the formula

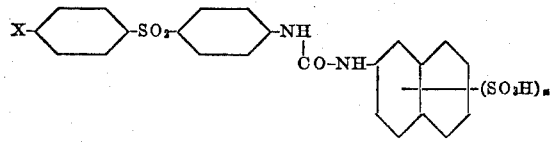

wherein X stands for a nitrogenous group selected from the group consisting of nitro, amino and carboxylic acylamino groups and $n$ stands for one of the numbers 1 and 2, and its alkali and alkaline earth metal, ammonium and amine salts which are soluble in water with neutral reaction.

2. A diphenylsulphone compound of the formula

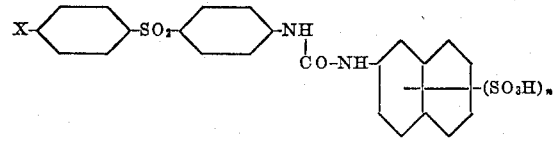

wherein X stands for a carboxylic acylamino group and $n$ stands for one of the numbers 1 and 2 and its alkali and alkaline earth metal, ammonium and amine salts which are soluble in water with neutral reaction.

3. A diphenylsulphone compound of the formula

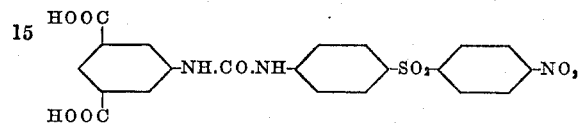

and its salts.

4. A diphenylsulphone compound of the formula

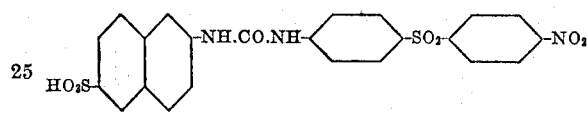

and its salts.

5. A diphenylsulphone compound of the formula

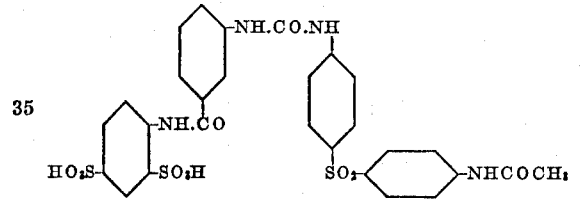

and its salts.

6. A diphenylsulphone compound, the 4-position of which is substituted by a member of the group consisting of nitro, amino and carboxylic acylamino groups, and the 4' position of which contains an urea group which is substituted by a member of the group consisting of carboxy alkyl, carboxy aryl, sulphonic alkyl, sulphonic aryl, sulphinic alkyl and sulphinic aryl, and its salts.

PAUL PÖHLS.